United States Patent
Wang et al.

(10) Patent No.: US 8,035,348 B2
(45) Date of Patent: Oct. 11, 2011

(54) BATTERY OVERHEATING PROTECTION CIRCUIT

(75) Inventors: Han-Che Wang, Taipei Hsien (TW); Xin Zhao, Shenzhen (CN); Hong-Sheng Ouyang, Shenzhen (CN); Xiao-Guang Li, Shenzhen (CN); Shin-Hong Chung, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 511 days.

(21) Appl. No.: 12/189,809

(22) Filed: Aug. 12, 2008

(65) Prior Publication Data
US 2009/0051326 A1    Feb. 26, 2009

(30) Foreign Application Priority Data

Aug. 24, 2007   (CN) .......................... 2007 1 0076575

(51) Int. Cl.
*H02J 7/04* (2006.01)
*H02J 7/00* (2006.01)
(52) U.S. Cl. ......... 320/150; 320/134; 320/136; 320/152
(58) Field of Classification Search .................. 320/150
See application file for complete search history.

(56) References Cited

U.S. PATENT DOCUMENTS

| | | | | |
|---|---|---|---|---|
| 6,288,883 B1 * | 9/2001 | Chen | ............................... | 361/58 |
| 7,434,985 B2 * | 10/2008 | Hsu et al. | ........................... | 374/1 |
| 7,830,124 B2 * | 11/2010 | McClure | ....................... | 320/136 |
| 2006/0076926 A1 * | 4/2006 | Lee | .................... | 320/112 |
| 2006/0164041 A1 * | 7/2006 | Ooshita et al. | ................. | 320/150 |
| 2006/0255771 A1 * | 11/2006 | Sakakibara | .................... | 320/150 |
| 2007/0140031 A1 * | 6/2007 | Sako | ............................. | 365/212 |

FOREIGN PATENT DOCUMENTS
CN        2840470 Y     11/2006

\* cited by examiner

*Primary Examiner* — M'Baye Diao
(74) *Attorney, Agent, or Firm* — Zhigang Ma

(57) ABSTRACT

A battery overheating protection circuit includes a thermal resistor samples the temperature of the battery and converts the temperature into a temperature voltage, a comparison circuit compares the temperature voltage with a reference voltage for judging whether the temperature of the battery is higher than the maximum reference temperatures temperature or not. If yes, the comparison circuit outputs a protection signal to drive a charging module to stop charging the battery in the charging process, and to cut off the conducting path to draw power from the battery in the discharging process. The present invention sets two different maximum reference temperatures during charging process and discharging process by a reference voltage module, which makes the maximum allowable discharging temperature is higher than the maximum allowable charging temperature.

14 Claims, 3 Drawing Sheets

BATTERY OVERHEATING PROTECTION CIRCUIT

BACKGROUND

1. Technical Field

The present invention relates to battery circuits, and particularly to a battery circuit with the function of overheating protection.

2. General Background

Nowadays, handheld devices (e.g., mobile phones, media players) are more and more popular. These handheld devices are typically powered with a battery pack, which includes one or more cells to form a battery. Generally, the battery would be damaged and becomes dangerous when the temperature of the battery is too high. The temperature of the battery should be controlled below a limited temperature when the battery is either charged or discharged.

A circuit in related art can protect the battery from overheating when the battery is either charged or discharged. When the temperature of the battery goes higher than a predetermined temperature, the circuit interrupts charging or discharging of the battery. The circuit has the same interruption temperature for both the battery charging process and the discharging process. However, generally, charging of batteries must be halted at a certain temperature and discharging of batteries (i.e., in normal uses) must be halted at a somewhat higher temperature. In addition, the circuit adopts an intelligent chip to achieve the function of protecting the batteries from overheating, which adds to the cost.

According to this, it is necessary to provide a device to overcomes the above-identified deficiencies.

SUMMARY

The present invention provides an battery overheating protection circuit which can protect the battery from overheating in battery charging process and discharging process with a low cost.

An battery overheating protection circuit is provided, the protection circuit includes a connection jack, a charging module, a temperature detection module, a reference voltage module, a comparison circuit, a control module and a path switch. The connection jack is configured for connecting with a power source. The charging module is connected with the connection jack and is configured for recharging a battery. The temperature detection module is configured for detecting a temperature of the battery and generating a temperature voltage proportional to the temperature. The reference voltage module is configured for providing a first reference voltage in a battery charging process and a second reference voltage in a drawing battery power process. The comparison circuit is configured for comparing the temperature voltage with the first reference voltage in the battery charging process and comparing the temperature voltage with the second reference voltage in the drawing battery power process, and outputting a protection signal when the comparison result indicates the temperature of the battery goes higher than a corresponding temperature limit. The control module is configured for receiving the protection signal and disabling the charging module to charge the battery. And the path switch is located along a conducting path to draw power from the battery and configured for cutting off the conducting path when receiving the protection signal.

BRIEF DESCRIPTION OF THE DRAWINGS

The components in the drawings are not necessarily drawn to scale, the emphasis instead being placed upon clearly illustrating the principles of the present overheating protection circuit. Moreover, in the drawings, like reference numerals designate corresponding parts throughout the several views.

DETAILED DESCRIPTION OF THE EMBODIMENTS

Figure 1:
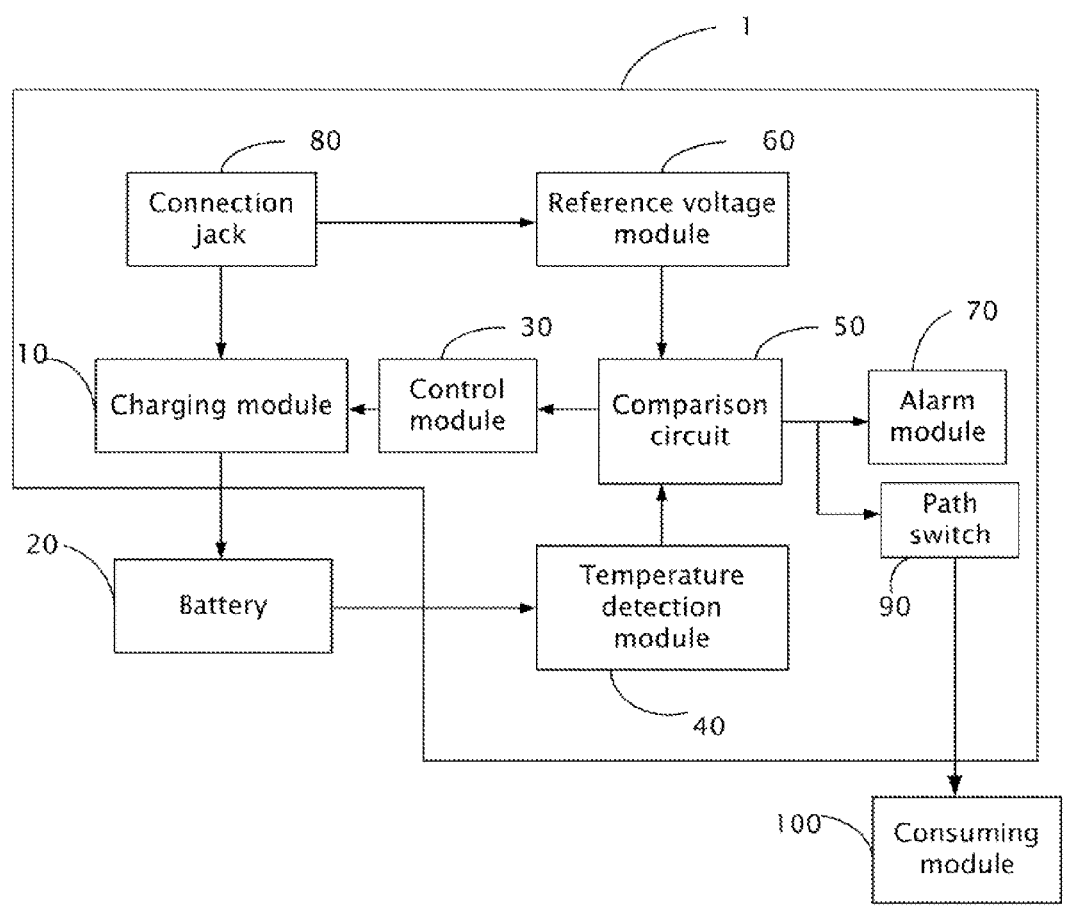
FIG. 1 is a block diagram of a battery overheating protection circuit in accordance with an exemplary embodiment of the present invention.

Referring to FIG. 1. The battery overheating protection circuit 1 includes a charging module 10, a control module 30, a temperature detection module 40, a comparison circuit 50, a reference voltage module 60, a connection jack 80, and a path switch 90.

The charging module 10 is capable of recharging a battery 20, the battery 20 is a rechargeable battery, and the connection jack 80 is capable of connecting to a power source. The temperature detection module 40 is used to detect a temperature of the battery 20 and generate a voltage (hereinafter, temperature voltage) proportional to the temperature. The reference voltage module 60 provides a first reference voltage $V_{ref1}$ when the charging module 10 is charging the rechargeable battery 20, and a second reference voltage $V_{ref2}$ when a consuming module 100 is drawing power from the rechargeable battery 20. The consuming module 100 includes many function components which implement one or more functions. The first reference voltage $V_{ref1}$ and the second reference voltage $V_{ref2}$ are predetermined values that indicate the critical temperature voltages proportional to the maximum allowable temperatures, configured for a battery charging process and a drawing battery power process respectively. The maximum allowable temperature configured for the drawing battery power process is generally higher than that for the battery charging process. The path switch 90 is located along a conducting path to draw power from the battery 20 to the consuming module 100. The comparison circuit 50 is used to compare a current temperature voltage against the first reference voltage during the battery charging process and to compare the temperature voltage with the second reference voltage during the drawing battery power process.

When the connection jack 80 is connected to a power source and starts charging the battery 20, the comparison circuit 50 compares the temperature voltage with the first reference voltage $V_{ref1}$. When the temperature voltage of the battery 20 rises above the first reference voltage $V_{ref1}$, the comparison circuit 50 outputs a protection signal to the control module 30. When the control module 30 receives the protection signal and controls the charging module 10 to stop charging the battery 20 accordingly. The comparison circuit 50 also outputs the protection signal to an alarm module 70. The alarm module 70 outputs an alarm signal accordingly and the alarm signal can be an audible alarm, a visual alarm, etc.

When power is drawn from the battery 20, the comparison circuit 50 compares the temperature voltage with the second reference voltage $V_{ref2}$. When the temperature voltage rises above the second reference voltage $V_{ref2}$, the comparison circuit 50 outputs the protection signal to disable the path switch 90. As a result, the consuming module 100 is no longer able to draw power from the battery 20. Meanwhile, the comparison circuit 50 outputs the protection signal to the alarm module 70. The alarm module 70 accordingly outputs an alarm signal.

Figure 2:
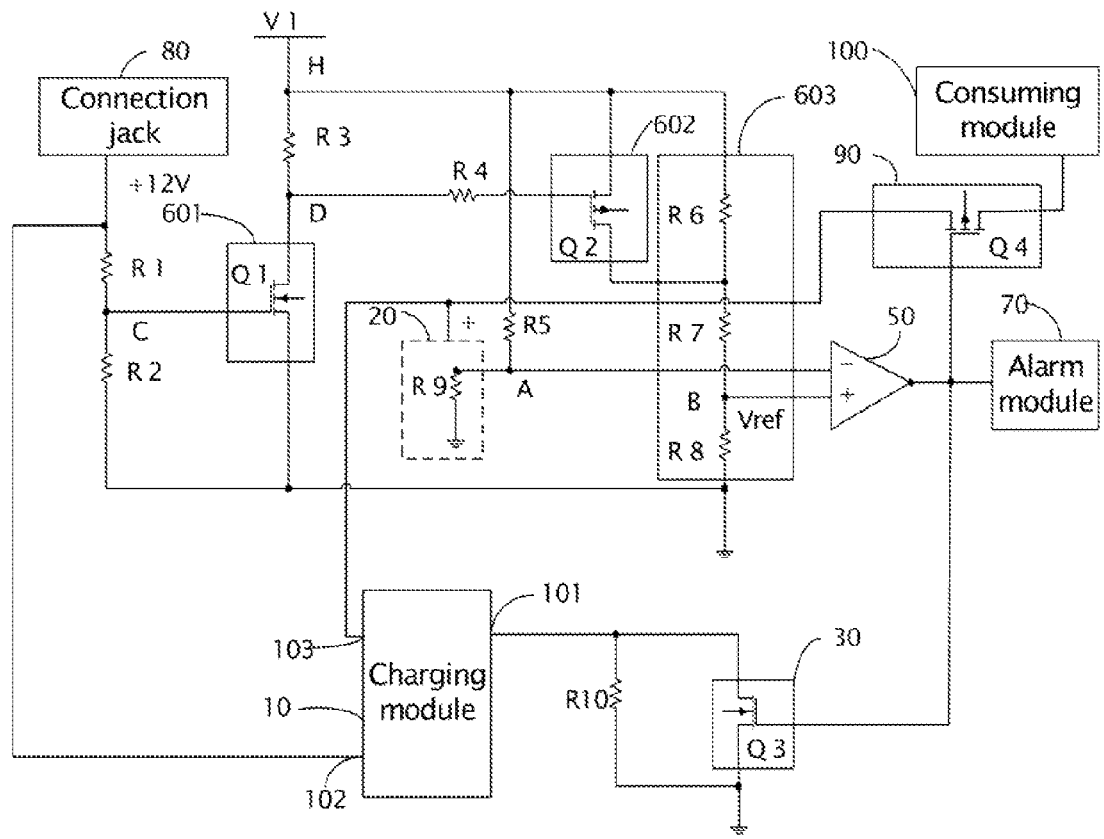
FIG. 2 is a circuit diagram showing a first implementation of the circuit of FIG. 1.

Referring also to FIG. 2, in a first implementation, the power source is an AC/DC adaptor which capable of converting an alternating current to a direct current, and in other implementations, the power source can be a universal series bus (USB) power source (e.g., a USB port of a computer). The charging module 10 includes a control pin 101, an input pin 102, and an output pin 103. The input pin 102 is connected to an anode of the connection jack 80, the output pin 103 is connected to an anode of the battery 20, and the control pin 101 is connected to the control module 30. The charging module 10 is disabled when the control pin 101 is at a low voltage level.

The temperature detection module 40 includes a thermal resistor R9 and a resistor R5 which are serially connected between a positive potential node H and ground. The thermal resistor R9 is located inside the battery 20. In the first implementation, the thermal resistor R9 is a negative temperature coefficient (NTC) thermal resistor having resistance that decreases with increasing temperature. The comparison circuit 50 includes an inverting input port A, a non-inverting input port B, and an output port (not shown). A connection node of the resistors R9 and R5 is connected to the inverting input port A of the comparison circuit 50.

The control module 30 is a high voltage activated switch, while the path switch 90 is a low voltage activated switch. The control module 30 and the path switch 90 both include a control terminal, a first path terminal, and a second path terminal. In the first implementation, an n-channel metal-oxide-semiconductor field-effect transistor (NMOSFET) Q3 and a p-channel metal-oxide-semiconductor field-effect transistor (PMOSFET) Q4 are taken as an example to illustrate the control module 30 and the path switch 90 respectively. Gates, sources, drains of the MOSFETs Q3, Q4 constitute the control terminals, the first path terminals, the second path terminals of the control module 30 and the path switch 90 respectively. In other implementations, the control module 30 can be a negative-positive-negative (NPN) bipolar junction transistor (BJT) and the path switch 90 can be a positive-negative-positive (PNP) BJT.

The gates of the NMOSEET Q3 and the PMOSFET Q4 are both connected to the output port of the comparison circuit 50. The NMOSEFT Q3 and a resistor R10 are connected in parallel between the control pin 101 of the charging module 10 and the ground. The source and drain of the NMOSFET Q3 are connected to the ground and the control pin 101 respectively. The source of the PMOSFET Q4 is connected to the anode of the battery 20 and the drain of the PMOSFET Q4 is connected to the consuming module 100.

The reference voltage module 60 includes a first switch 601, a second switch 602, a voltage-dividing circuit 603, and a plurality of resistors R1, R2, R3, R4. The first switch 601 and the second switch 602 both include a control terminal, a first path terminal and a second path terminal. In the first implementation, the first switch 601 is an NMOSFET Q1 and the second switch 602 is a PMOSFET Q2. The voltage-dividing circuit 603 includes resistors R6, R7, R8 which are serially connected between the positive potential point H and the ground. The second switch 602 is connected in parallel with the resistor R6. A connection node of the resistors R7, R8 is connected to the non-inverting input port B of the comparison circuit 50, and the connection node of the resistors R7, R8 provides the reference voltages $V_{ref1}$ or $V_{ref2}$ to the non-inverting input port B of the comparison circuit 50.

To more clearly describe the first implementation, a gate of the NMOSEET Q1 is symbolically expressed as a node C and a drain of the NMOSFET Q1 is symbolically expressed as a node D. The node C is connected to the anode of the connection jack 80 through the resistor R1. The node C is further connected to the ground through the resistor R2. The node D is connected to the positive potential point H through the resistor R3. The node D is further connected to the gate of the PMOSFET Q2. The source of the PMOSFET Q2 is connected to the positive potential point H, and the drain of the PMOSFET Q2 is connected to a connection node of the resistors R6 and R7. The source of the NMOSFET Q1 is grounded. The positive potential point H provides a voltage V1. The voltage V1 is drawn from the battery 20 during the drawing battery power process and from the AC/DC adaptor during the battery charging process.

When the AC/DC adapter is plugged into the connection jack 80 and starts charging the battery 20. The node C, i.e., the gate of the NMOSFET Q1 obtains a high voltage level from the connection jack 80 and switches on the NMOSFET Q1. The gate of the PMOSFET Q2 is grounded through the NMOSFET Q1 and accordingly enables the PMOSFET Q2. The resistor R6 is bypassed by the PMOSFET Q2 and the reference voltage $V_{ref1}$ provided to the non-inverting port B of the comparison circuit 50 is equals to V1*R8/(R8+R7).

The thermal resistor R9 provides the temperature voltage to the inverting port A of the comparison circuit 50. Initially, the temperature voltage is higher than the reference voltage $V_{ref1}$. The temperature voltage declines as the temperature of the thermal resistor R9 increases gradually. When the temperature voltage drops below the reference voltage $V_{ref1}$, the comparison circuit 50 outputs the protection signal both to the NMOSFET Q3 and the alarm module 70. The protection signal is a high voltage level signal which enables the NMOSFET Q3. The control pin 101 of the charging module 10 becomes grounded through the NMOSFET Q3, and as a result the charging module 10 stops charging the battery 20. In the first implementation, the alarm module 70 is activated by a high voltage level and accordingly output an alarm signal.

When the AC/DC adaptor is not plugged in the connection jack 80 and the consuming module 100 is drawing power from the battery 20, i.e., the battery 20 supplies power to the consuming module 100, the node C is maintained at a low voltage level that disables the NMOSFET Q1. The gate of the PMOSFET Q2 is connected to the positive potential point H through the resistors R3, R4 and obtains a high voltage level that disables the PMOSFET Q2. The reference voltage $V_{ref2}$ is supplied to the non-inverting port B of the comparison circuit 50. The reference voltage $V_{ref2}$ is equal to V1*R8/(R8+R7+R6) and lower than the reference voltage $V_{ref1}$ corresponding the battery charging process. Initially, the temperature voltage is higher than the reference voltage $V_{ref2}$. The temperature voltage drops gradually while the temperature of the thermal resistor R9 increases gradually. When the temperature voltage drops below the reference voltage $V_{ref2}$, the comparison circuit 50 outputs the high voltage level protection signal to the alarm module 70 and the PMOSFET Q4. As a result, the PMOSFET Q4 is disabled and cut off the conducting path to draw power from the battery 20. Meanwhile, the alarm module 70 receives the high voltage level protection signal and outputs an alarm signal.

In the first implementation, by providing the relatively higher reference voltage $V_{ref1}$ during the battery charging process and the relatively lower reference voltage $V_{ref2}$ during the drawing battery power process, the discharging process of the battery is halted at a somewhat higher temperature than in the charging process.

Figure 3:
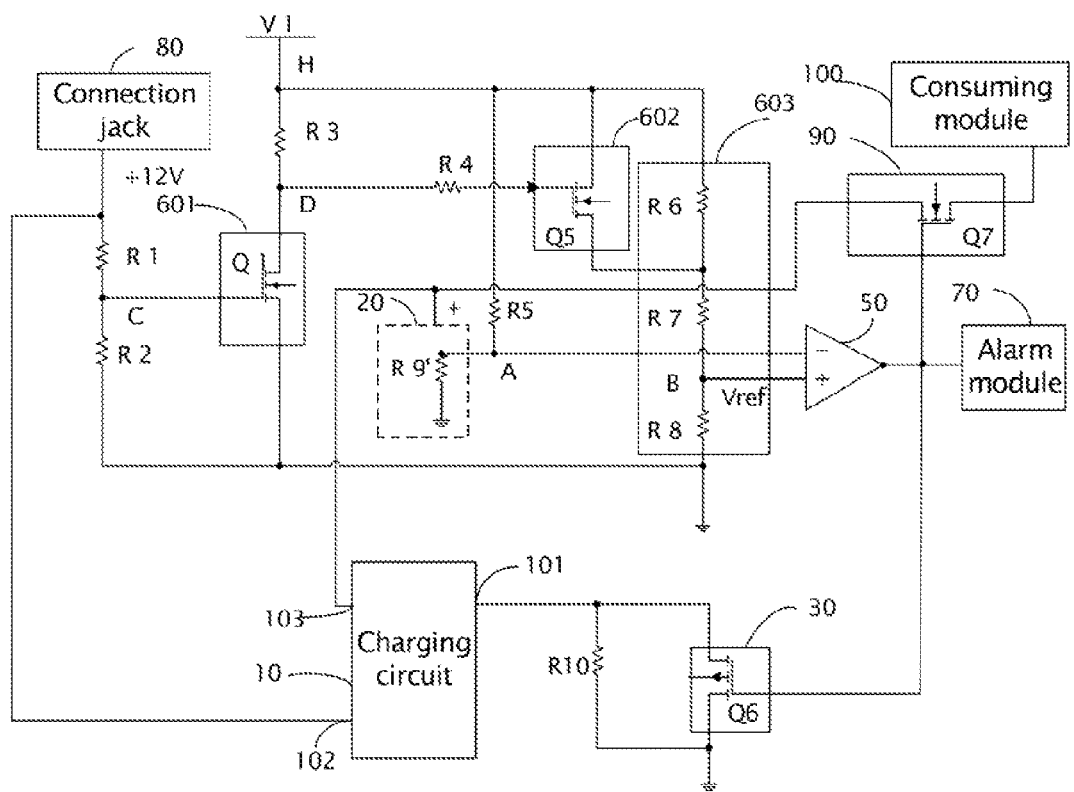
FIG. 3 is a circuit diagram showing a second implementation of the circuit of FIG. 1.

Referring to FIG. 3, in a second implementation, the second switch 602 is a high voltage activated switch such as an NMOSFET Q5. The thermal resistor R9' is a positive temperature coefficient (PTC) thermal resistor having resistance that increases with increasing temperature. The path switch 90 is a high voltage activated switch, an NMOSFET Q7 which is taken as an example to illustrate the path switch 90. The control module 30 is a low voltage activated switch and an NMOSFET Q6, taken as an example to illustrate the control module 30. In the initial state, the temperature voltage is lower than the reference voltage $V_{ref1}$ during the battery charging process and the reference voltage $V_{ref2}$ during the drawing battery power process.

When the AC/DC adapter is plugged into the connection jack 80 and starts charging the battery 20, the first switch 601 is enabled and connects the gate of the NMOSFET Q5 to the ground. The NMOSFET Q5 is accordingly disabled. As a result, the reference voltage $V_{ref1}$ is equal to V1*R8/(R8+R7+R6). The temperature voltage increases gradually as the temperature of the thermal resistor R9' increases gradually. When the temperature voltage goes above the reference voltage $V_{ref1}$, the comparison circuit 50 outputs a protection signal both to the PMOSFET Q6 and the alarm module 70. The protection signal is a low voltage level signal which enables the PMOSFET Q6. The control pin 101 of the charging module 10 is grounded through the PMOSFET Q6, and as a result, the charging module 10 stops charging the battery 20. The alarm module 70 in the second implementation is activated by a low voltage level and accordingly outputs an alarm signal.

When the AC/DC adaptor is not plugged in the connection jack 80 and the consuming module 100 is drawing power from the battery 20, i.e., the battery 20 supplies power to the consuming module 100. The first switch 601 is disabled. The gate of the NMOSFET Q5 is connected to the positive potential point H through the resistor R3, R4 and obtains a high voltage level that enables the NMOSFET Q5, the resistor R6 is bypassed by the NMOSFET Q5. The reference voltage $V_{ref2}$ is equal to V1*R8/(R8+R7) and higher than the reference voltage $V_{ref1}$ configured for the battery charging process. The temperature voltage increases gradually as the temperature of the thermal resistor R9 increases gradually. When the temperature voltage goes above the reference voltage $V_{ref2}$, the comparison circuit 50 outputs the low voltage level protection signal and transmits the protection signal to the NMOSFET Q7 and the alarm module 70, so that the NMOSFET Q7 is disabled and the alarm module 70 is activated. The conducting path to draw power from the battery 20 is accordingly cut off and the alarm module 70 outputs an alarm signal.

In the second implementation, by providing the relatively lower reference voltage $V_{ref1}$ in the charging process and the relatively higher reference voltage $V_{ref2}$ in the drawing battery power process, the drawing battery power process of the battery is halted at a somewhat higher temperature than in the charging battery power process.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery overheating protection circuit, comprising:
   a connection jack configured for connecting with a power source;
   a charging module connected with the connection jack and configured for recharging a battery;
   a temperature detection module configured for detecting a temperature of the battery and generating a temperature voltage proportional to the temperature;
   a reference voltage module configured for providing a first reference voltage in a battery charging process and a second reference voltage in a drawing battery power process;
   a comparison circuit configured for comparing the temperature voltage with the first reference voltage in the battery charging process and comparing the temperature voltage with the second reference voltage in the drawing battery power process, and outputting a protection signal when the comparison result indicates the temperature voltage of the battery goes higher than the first reference voltage in the battery charging process or the second reference voltage in the drawing battery power process;
   a control module configured for receiving the protection signal and disabling the charging module to charge the battery in the battery charging process; and
   a path switch located along a conducting path to draw power from the battery and configured for cutting off the conducting path when receiving the protection signal in the drawing battery power process.

2. The protection circuit of claim 1, wherein the charging module comprises a control pin configured for disabling the charging module when at a low voltage level.

3. The protection circuit of claim 2, wherein the control module is connected between the control pin of the charging module and ground, and the control module comprises a control terminal which is connected to the comparison circuit and configured for receiving the protection signal to enable the control module and make the control pin of the charging module to be grounded.

4. The protection circuit of claim 1, wherein the comparison circuit comprises an inverting input port and a non-inverting input port, the temperature detection module is connected to the inverting input port of the comparison circuit, and the reference voltage module is connected to the non-inverting input port of the comparison circuit.

5. The protection circuit of claim 4, wherein the reference voltage module comprises a first switch, a second switch, and a voltage-dividing circuit, the voltage-dividing circuit further comprising a plurality of resistors, which are serially connected between a positive potential point and ground; each of the first switch and the second switch includes a control terminal, a first path terminal, and a second path terminal; the control terminal of the first switch is connected to an anode of the connection jack, the first path terminal of the first switch is grounded, and the second path terminal of the first switch is connected to the positive potential point, the second switch and the first resistor is connected in parallel between the positive potential point and the second resistor, and the control terminal of the second switch is connected to the second path terminal of the first switch, the control terminal of the second switch also connected to the positive potential point, the first path terminal and the second path terminal of the second switch is connected to the positive potential point and the second resistor respectively.

6. The protection circuit of claim 5, wherein the first switch is a high voltage activated switch and the second switch is a low voltage activated switch, when the connection jack is connected to the power source and charging the battery, the control terminal of the first switch is at high voltage level and the first switch is accordingly enabled, the control terminal of the second switch is connected to the ground through the first switch, then the second switch is enabled and bypasses the first resistor, the reference voltage module provides the first reference voltage, when power is drawn from the battery, the control terminal of the first switch is at low voltage level, thus the first switch is disabled, the control terminal of the second switch obtains a high voltage level from the positive potential point and enables the second switch, the reference voltage module provides the second reference voltage.

7. The protection circuit of claim 6, wherein the temperature detection module comprises a negative temperature coefficient (NTC) thermal resistor.

8. The protection circuit of claim 7, wherein the control module is an n-channel metal-oxide-semiconductor field-effect transistor (NMOSFET) or a Negative-Positive-Negative (NPN) bipolar junction transistor (BJT), and the path switch is a P-channel metal-oxide-semiconductor field-effect transistor (PMOSFET) or a Positive-Negative-Positive (PNP) BJT; when the temperature voltage drops below the reference voltage, the comparison circuit output a high voltage level protection signal, and the control module receives the high voltage level protection signal to control the charging module stops charging the battery, and the path switch is disabled when receiving the high voltage level protection signal during the drawing battery power process.

9. The protection circuit of claim 5, wherein, the first switch and the second switch both are high voltage activated switches, when the connection jack is connected to the power source and start charging the battery, the control terminal of the first switch is at high voltage level and the first switch is accordingly enabled, the control terminal of the second switch is connected to the ground through the first switch, then the second switch is disabled, the reference voltage module provides the first reference voltage; when power is drawn from the battery, the control terminal of the first switch is at low voltage level, thus the first switch is disabled, the control terminal of the second switch is obtain a high voltage level from the positive potential point, then the second switch is enabled and bypass the first resistor, the reference voltage module provides the second reference voltage.

10. The protection circuit of claim 9, wherein the temperature detection module comprises a positive temperature coefficient (PTC) thermal resistor.

11. The protection circuit of claim 10, wherein the control module is a PMOSFET or a PNP BJT, and the path switch is a NMOSFET or a NPN BJT; when the temperature voltage higher than the reference voltage, the comparison circuit outputs a low voltage level protection signal, and the control module receives the lower voltage protection signal to disable the charging module in battery charging process, and the path switch is disabled when receiving the high voltage level protection signal during drawing battery power process.

12. The protection circuit of claim 5, wherein the first switch is an NMOSFET or an NPN BJT, and the second switch is a PMOSFET or a PNP BJT.

13. The protection circuit of claim 9, wherein both of the first switch and the second switch are NMOSFETs or NPN BJTs.

14. The protection circuit of claim 5, further comprising an alarm module which is connected to the comparison circuit, the alarm module is configured to output alarm signal when receiving the protection signal from the comparison circuit.

* * * * *